G. W. SWETT.
Furnace for Refining Iron, Steel, &c.
No. 38,186.　　　　　　　　　　　　　　Patented April 14, 1863.
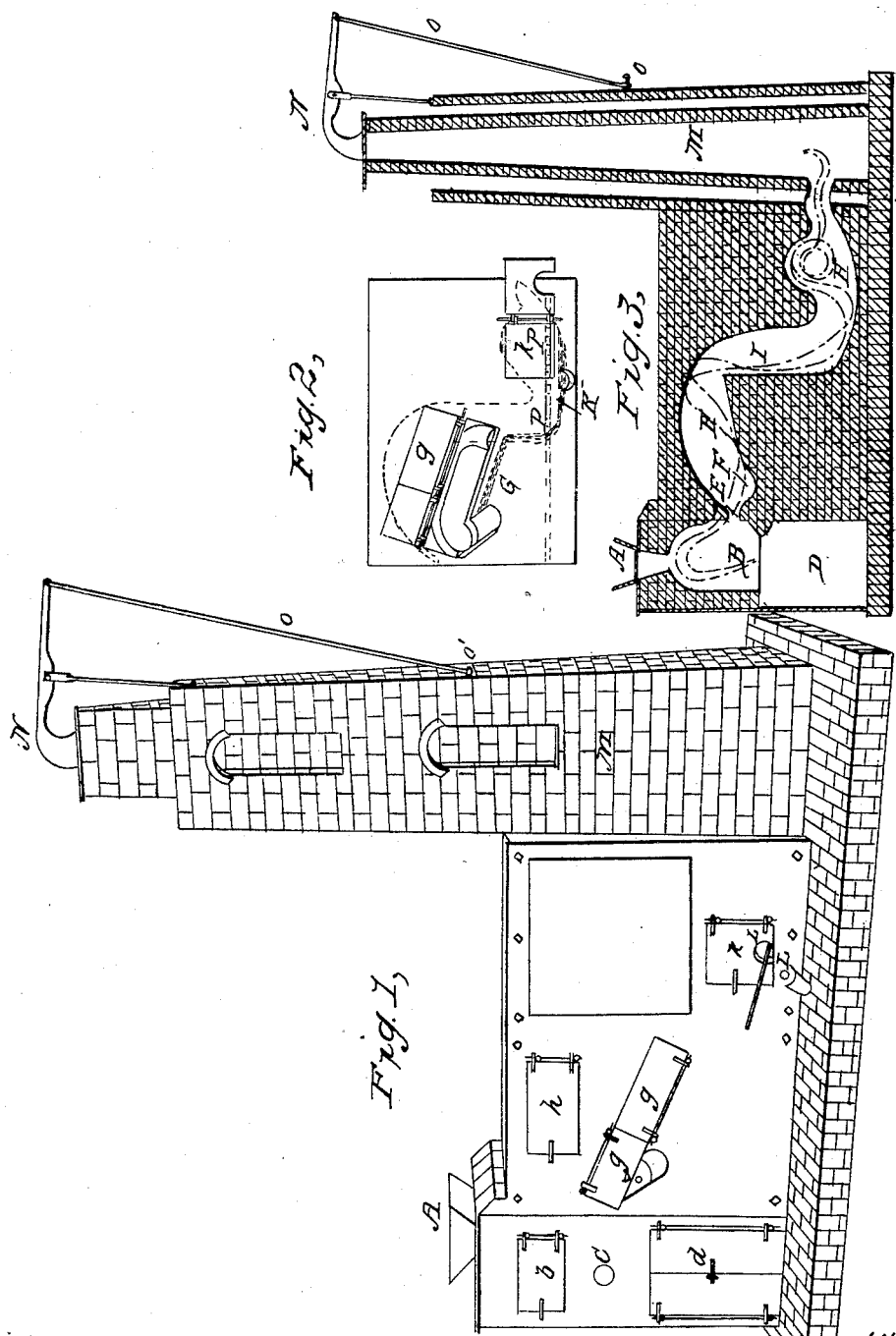
WITNESSES:
INVENTOR

United States Patent Office.

GEORGE W. SWETT, OF TROY, NEW YORK.

IMPROVED FURNACE FOR SMELTING ORES AND FOR OTHER PURPOSES.

Specification forming part of Letters Patent No. 38,186, dated April 14, 1863.

*To all whom it may concern:*

Be it known that I, G. W. SWETT, of Troy, in the county of Rensselaer, State of New York, have invented a new and useful Improvement in the Construction of Furnaces for Smelting of Ores and Metals—as iron, steel, and others; and I do hereby declare that the following is a full, clear, and exact description of the same, reference being had to the accompanying drawings, of which—

Figure I is a perspective view; Fig. II, a longitudinal vertical section; and Fig. III, a condensed front elevation with open doors, showing the proceeding of the operation.

Like letters in all figures indicate corresponding parts.

The object of my invention consists in the construction of a furnace wherein ores of various kinds, as well as metals can be reduced and smelted without having the solid particles of coal—as reducing material—directly intermixed with the mentioned ores and metals; also having such a combination that a larger amount of metal can be kept in a melted state, while fresh material is added in the furnace, both being separated from each other as hereinafter described.

The following are a few of the advantages that result in the use of my furnace:

First. It is self-evident that, as ores and metals can therein be smelted without coming in contact with the solid parts of the fuel, a product of greater purity must result, and the smelting process be better under the control of the operator. The volatile particles of the coal, however, are in immediate proximity of the ore or metal—an advantage that no air nor cupola-furnace is able to present, and which feature most particularly distinguishes this furnace from those now in use. In the air or puddling furnace the distance between the point of combustion and the point of action on the ore or metal is too great to allow the action of the carbon in its so-called "nascent state" to develope itself. As proof thereof, I can state that the same kind of iron that in the cupola-furnace gives gray iron produces white iron in the air-furnace. The cupola-furnace becomes frequently clogged up near the tuyeres, while in my furnace no stoppage or inequality of work is possible. The separation from the solid particles of the fuel, therefore, and the proximity (to the materials to be smelted) of the volatile products of combustion constitutes a new and most important feature of my invention.

Secondly. The heat that in other furnaces (as, for instance, blast, cupola, puddling, or other furnaces) is left to pass off, or, in the best case, is used to heat up a few steam-boilers, is in my furnace, by direct as well as reflected action, used to keep a smaller or larger amount of metal in a melted state in a separate reservoir connected in proper way with the surface of the smelting-bed, as more specially described hereinafter.

Thirdly. The same furnace can, without any change whatever, be used for various processes. I will here only mention a few of the most important ones.

(*a.*) *For smelting of cast-iron.*—Unlike to the cupolas now in use, the pig-iron, in my furnace, placed on the inclined furnace-hearth is fully exposed to the combustible gases and blast, melts easier, and, uncontaminated with the silicious, argillaceous, and other to the iron injurious ingredients of the fuel, is, by a proper conduct and excluded from the atmosphere by its own specific gravity, made to flow into a reservoir heated by the reflected and direct heat of the first melting operation. From these, pure and equally heated, the cast-iron can be drawn off into the largest castings of ordnance, steam-cylinders, or any other objects where a good and equally-heated metal is indispensable. For lighter castings, the cast-iron can be drawn off from a cavity, into which the melted metal flows before it descends into the before-mentioned reservoir. For the manufacture of cast-iron, therefore, my furnace presents, by its economical construction, its saving of fuel, its easy working, and production of superior metal, features deserving consideration, more especially at this time when good castings of ordnance are of immense importance to our nation.

(*b.*) *For the manufacture of cast as well as puddled steel.*—It having been demonstrated that steel can be melted in puddling-furnaces, my device presents in all its features great advantages, as therein steel cannot only be melted, but accumlated in a melted state, kept for large castings. Further, the lower reservoir can be used as puddling-furnace. If cast-iron is, by a hollow tool injecting atmospheric air, deprived of a part of its carbon, puddled as well as cast-steel, homogeneous metal, or semi-steel can be produced in the same furnace.

(*c.*) *For the manufacture of wrought-iron from ore or prepared cinder.*—The aforementioned data suggest by themselves the adaptability of this furnace for the manufacture of iron from ore, or tap-cinder of puddling, refining, or heating furnaces. It has been mentioned before that the lower reservoir can be used as puddling-furnace. It is, therefore, very easy to see that the cast-iron, deprived of its slag or flux in the upper cavity of the furnace, can, in the lower reservoir, be puddled to wrought-iron.

(*d.*) *For smelting of other metals and ores—for instance, silver, lead, cobalt, nickel, aluminum, &c.—also, for desulphurizing of pyrites, &c.*—To any one familiar with metallurgy, the adaptability of this furnace for a great many important processes must at once be apparent.

Having enumerated some of the advantages that can be derived from my furnace, I will now proceed to the description of its peculiar parts of construction.

Fig. III of the attached drawings shows the following parts: A is the opening through which the fuel is introduced. This opening can be made as self-feeding from above, or be arranged on the side. B is the grate and fire-place, and $b$ a door leading to the same. C indicates the place where the blast can be introduced, striking the fuel in such a manner as to cause the heat-lines to proceed as shown by the dotted lines in Fig. III. The blast can be introduced under the grate or above, so as to produce the desired effect. D is the ash-pit, and $d$ the door leading to it. E is the fire-bridge dividing the fuel from the material that is to be melted. F is a small reservoir, a hollowed space from which, if desired, metal or flux can be run off through the tap-hole visible at $f$. This hole, when not used, is left closed by a clay or other refractory stopper. G is a channel or gutter in which the melted metal flows from the smaller reservoir down into the lower; $g\ g$, two doors leading into the above-named channel; H, the melting-furnace, the bottom of which is inclined, in order to cause the melted metal to flow off into the upper reservoir, F; $h$, the door leading to the same, and through which the material that is to be smelted is introduced. I is the descending neck, through which the waste heat coming from the furnace descends into K, the lower reservoir, and by its reverberatory and refracted action (indicated by the dotted lines of Fig. III) keeps the melted metal descending into it through the channel G in a melted state. $k$ is the door leading to it. When this lower reservoir is used as a puddling-furnace, this door has an opening through which the working-tool is inserted. L is the tap-hole to draw off the metal into molds or ladles, or if used for puddling, to draw off the cinder or flux; M, the chimney, and N the damper worked by the rod O and its handle $o$.

In Fig. II is shown a pipe, P, perforated with small holes traversing the lower furnace or reservoir, K, above the surface of the melted metal. This pipe is destined to introduce such gases as may be desirable for the refining of the metal. This pipe may also be inserted into the metal for the purpose to decarbonize and refine the metals with air or steam. Tap-holes for the abstraction of flux or cinder are also made in the upper as well as the lower reservoir, and for better convenience are arranged on the side opposite to the tap-holes in front.

What I claim as my invention, and desire to secure by Letters Patent, is—

The construction of a furnace combined of the parts described, or their equivalents, in the manner and for the purposes above specified.

GEORGE W. SWETT.

Witnesses:
G. H. ROBERTSON,
A. L. HENRY.